(12) United States Patent
Kashima

(10) Patent No.: US 7,068,345 B2
(45) Date of Patent: Jun. 27, 2006

(54) OPTICAL DEVICE

(75) Inventor: Keiji Kashima, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 122 days.

(21) Appl. No.: 10/250,779

(22) PCT Filed: Nov. 7, 2002

(86) PCT No.: PCT/JP02/11619

§ 371 (c)(1),
(2), (4) Date: Jul. 9, 2003

(87) PCT Pub. No.: WO03/040787

PCT Pub. Date: May 15, 2003

(65) Prior Publication Data

US 2004/0130670 A1 Jul. 8, 2004

(30) Foreign Application Priority Data

Nov. 9, 2001 (JP) .............................. 2001-345451
Oct. 3, 2002 (JP) .............................. 2002-291351

(51) Int. Cl.
  G02F 1/1335 (2006.01)
(52) U.S. Cl. ...................... 349/183; 349/117; 349/115
(58) Field of Classification Search ................ 349/117, 349/183, 115, 98; 359/483
See application file for complete search history.

(56) References Cited

U.S. PATENT DOCUMENTS 6,377,325 B1 *  4/2002  Faris et al. ................... 349/98

FOREIGN PATENT DOCUMENTS

| JP | 11-349947   | 12/1999 |
| JP | 2000-304919 | 11/2000 |
| JP | 2001-004842 | 1/2001  |
| JP | 2001-004843 | 1/2001  |
| JP | 2001-133628 | 5/2001  |

* cited by examiner

*Primary Examiner*—Robert Kim
*Assistant Examiner*—Richard Kim
(74) *Attorney, Agent, or Firm*—Oliff & Berridge, PLC

(57) ABSTRACT

An optical device in which a polymerizable liquid crystal material various optical characteristics of which is stable even against heating during manufacture of an optical apparatus such as an image display is cured. The optical device has a support and an optical functional layer made of a cured polymerizable liquid crystal material having a predetermined liquid crystal regularity and provided on the support. The optical device is characterized in that the optical device is subjected to a heat treatment at a predetermined temperature and in that the thickness decrease of the optical functional layer defined by (A-B)/A is 5% or less where A is the thickness of the optical functional layer after the heat treatment, and B is the thickness of the optical functional layer after the optical device is heated for 60 minutes at the heat-treatment temperature.

10 Claims, 1 Drawing Sheet

OPTICAL DEVICE

TECHNICAL FIELD

The present invention relates to a heat-resistant optical device which, even when heat is applied, is stable in various properties.

BACKGROUND ART

Optical devices, such as phase difference films and circularly polarized light controlling optical devices, are used, for example, in image display devices. In use, the optical device is in some cases incorporated in image display devices such as liquid crystal display devices. In the production of these image display devices, the assembly is sometimes heated at 200° C. or above, for example, for the formation of a polyimide film used as an aligning film or for the formation of an ITO film as a transparent electrode. Further, when the image display device using the optical device is used as a display in the inside of a car, the image display device is exposed to sunlight and consequently is sometimes heated by the sunlight to 100° C. or above. Therefore, the optical device, such as the phase difference film, used in image display devices such as liquid crystal display devices is possibly heated to a temperature of 100° C. or above and in some cases to 200° C. or above, depending upon the order of the incorporation of the optical device or the place where the Optical device is used.

On the other hand, in recent years, as described, for example, in Japanese Patent Laid-Open No. 100045/2001 and Published Japanese Translation of PCT Publication No. 508882/1998, Optical devices produced by polymerizing a polymerizable liquid crystal material have been proposed. These optical devices are advantageous in that properties of a liquid crystal can be anchored or immobilized by polymerization and can be used as a film. This has led to expectation of the development of optical devices to various applications.

Regarding optical devices such as phase difference films, Japanese Patent Laid-Open No. 2109/1993 discloses a stretched phase difference film possessing excellent heat resistance. Japanese Patent Laid-Open No. 142510/1993 discloses an optical device comprising a thermally polymerizable liquid crystalline polymer possessing excellent heat resistance. Further, Japanese Patent Laid-Open No. 133628/2001 discloses a highly heat-resistant polarizing diffractive film comprising a liquid crystal material which contains a polymeric liquid crystal and a crosslinkable material.

The optical device produced by polymerizing the polymerizable liquid crystal material, however, suffers from a problem that, for example, in the case of a cholesteric layer having cholesteric regularity, upon heating, a shift in center reflection wavelength disadvantageously occurs. Therefore, as described above, in use, when the optical device is incorporated in an image display device such as a liquid crystal display device, disadvantageously, the optical device can be used only in a site not exposed to heat during the production of the image display device.

Further, the stretched phase difference film disadvantageously undergoes a change in phase difference level at 80° C. or above, particularly at 100° C. or above, and, thus, when used, for example, in on-vehicle LCDs, poses an uneven display or other problems.

DISCLOSURE OF THE INVENTION

In view of the above problems of the prior art, the present invention has been made, and a main object of the present invention is to provide an optical device in which a polymerizable liquid crystal material various optical characteristics of which is stable even against heating during manufacture of an optical apparatus such as an image display device is cured.

The above object can be attained by an optical device characterized by comprising a support and an optical function layer provided on the support and formed by curing a polymerizable liquid crystal material while retaining predetermined liquid crystal regularity, the optical device having been heat treated at a predetermined temperature, said optical function layer having a percentage reduction in layer thickness, defined by (A-B)/A, of not more than 5% wherein A represents the thickness of the optical function layer after the heat treatment and B represents the thickness of the optical function layer after reheating the optical device at said heat treatment temperature for 60 min. When the percentage reduction in layer thickness upon heating for 60 min at the same temperature as the heat treatment temperature is within the above defined range, for example, the change in retardation value in the case of the use of the optical device as a phase difference plate and the change in center reflection wavelength in the case of the use of the optical device as a circularly polarized light controlling optical device can be minimized. Therefore, even when the optical device is incorporated in various image display devices, the change in function of the optical device can be minimized.

In a preferred embodiment of the present invention, the polymerizable liquid crystal material contains a photopolymerization initiator. This is because, when the polymerizable liquid crystal material is cured, for example, by ultraviolet light, the incorporation of a photopolymerization initiator is preferred from the viewpoint of accelerating polymerization. Further, an optical function layer formed by curing a polymerizable liquid crystal material containing a photopolymerization initiator can effectively develop the advantage of the present invention.

More preferably, the support is a supporting substrate having an aligning ability. This is advantageous from the viewpoint of the process, because, when an optical function layer can be formed on a supporting substrate having an aligning ability and as such can be used, there is no need to perform the step of transfer and the like.

According to another aspect of the present invention, there is provided a retardation layer laminate characterized by comprising a support and a retardation layer provided on the support and formed by curing a polymerizable liquid crystal material while retaining nematic regularity, smectic regularity, or cholesteric regularity, said retardation layer laminate having been heat treated at a predetermined temperature, said retardation layer having a percentage reduction in retardation, defined by (Ra-Rb)/Ra, of not more than 5% wherein Ra represents the retardation value of the retardation layer after the heat treatment and Rb represents the retardation value of the retardation layer after reheating the retardation layer laminate at said heat treatment temperature for 60 min. When the retardation layer laminate is incorporated in various image display devices, a change in retardation value upon heating within the above range poses no problem associated with the use of the retardation layer laminate.

In a preferred embodiment of the present invention, the polymerizable liquid crystal material comprises a photopolymerization initiator and a polymerizable liquid crystal monomer. More preferably, the polymerizable liquid crystal material having cholesteric regularity comprises a photopolymerization initiator, a polymerizable liquid crystal monomer, and a polymerizable chiral dopant. The retardation value is a value associated with the thickness of the retardation layer. The change in thickness of the retardation layer upon heating is estimated to depend upon the amount of the residue of the photopolymerization initiator. Therefore, when the polymerizable liquid crystal material contains a photopolymerization initiator, it is considered that the advantage of the present invention can be utilized.

More preferably, the support is a supporting substrate having an aligning ability. This is advantageous from the viewpoint of the process, because, when a retardation layer can be formed on a supporting substrate having an aligning ability and as such can be used as a retardation layer laminate, there is no need to perform the step of transfer and the like.

According to still another aspect of the present invention, there is provided a circularly polarized light controlling optical device characterized by comprising a support and a cholesteric layer provided on the support and formed by curing a polymerizable liquid crystal material while retaining cholesteric regularity, said circularly polarized light controlling optical device having been heat treated at a predetermined temperature, said cholesteric layer having a percentage change in center reflection wavelength, defined by $|\lambda a - \lambda b|/\lambda a$, of not more than 5% wherein $\lambda a$ represents the center reflection wavelength of the cholesteric layer after the heat treatment and $\lambda b$ represents the center reflection wavelength of the cholesteric layer after reheating the circularly polarized light controlling optical device at said heat treatment temperature for 60 min. For example, when the circularly polarized light controlling optical device is incorporated in an image display device such as a color filter, a change in center reflection wavelength upon heating within the above range poses no problem associated with the use of the circularly polarized light controlling optical device.

In a preferred embodiment of the present invention, the polymerizable liquid crystal material comprises a photopolymerization initiator, a polymerizable liquid crystal monomer, and a polymerizable chiral dopant. The center reflection wavelength of the cholesteric layer depends upon the helical pitch, and a change in layer thickness causes a change in helical pitch. Accordingly, for the same reason as described above, the polymerizable liquid crystal material preferably contains a photopolymerization initiator.

More preferably, the support is a supporting substrate having an aligning ability. This is advantageous from the viewpoint of the process, because, when a cholesteric layer can be formed on a supporting substrate having an aligning ability and as such can be used as the circularly polarized light controlling optical device, there is no need to perform the step of transfer and the like.

According to a further aspect of the present invention, there is provided a method for heat treating an optical device, characterized by comprising the step of heat treating, at a predetermined temperature, an optical device comprising a support and an optical function layer provided on the support and formed by curing a polymerizable liquid crystal material while retaining predetermined liquid crystal regularity, whereby heat resistance is imparted to the optical device. The heat treatment in the above temperature range can previously remove ingredients which are removed at the time of heating of the inside of the optical function layer. Further, the degree of polymerization of the polymerizable liquid crystal material (three-dimensional network) can be enhanced. Therefore, even when heating is carried out later, that is, even when heating is carried out, for example, in the production of an image display device, a change in layer thickness and, in its turn, a change in properties can be prevented. Thus, heat stability can be imparted to the optical function layer.

According to still another aspect of the present invention, there is provided a method for heat treating an optical device, characterized by comprising the step of heat treating an optical device comprising a supporting substrate and an optical function layer, provided on the supporting substrate and formed by curing a polymerizable liquid crystal material while retaining predetermined liquid crystal regularity, at or above a temperature which corresponds to an isotropic layer before polymerizing the polymerizable liquid crystal material, whereby heat resistance is imparted to the optical device. Thus, the heat treatment at or above a temperature which corresponds to an isotropic layer before polymerizing the polymerizable liquid crystal material can bring molecules, which have not been fully polymerized (crosslinked), in the optical device to a more stable state. Therefore, even when heating is carried out in the production of an image display device or the like, a change in layer thickness and, in its turn, a change in properties can be prevented and, consequently, heat stability can be imparted to the optical function layer.

In the heat treatment method according to the present invention, preferably, the heat treatment is carried out for 10 to 60 min. The heat treatment for a period of time in the above defined range can provide an optical function layer possessing better heat stability.

Further, the polymerizable liquid crystal material preferably contains a photopolymerization initiator, because a change in layer thickness upon heating is considered to be related to the presence of the residue of the photopolymerization initiator present in the layer.

More preferably, the content of the photopolymerization initiator is not less than 1% by mass. When the content of the photopolymerization initiator in the above defined range can particularly utilize the advantage of the present invention.

In a preferred embodiment of the present invention, the heat treatment is carried out at a temperature between a temperature applied to the optical device in the production process of an optical apparatus, in which the optical function layer is used later, and a temperature 10° C. above the temperature applied in the production process. For example, when the optical device is used in a liquid crystal display device, previous heat treatment of the optical device at a temperature between a temperature applied to the optical device in the production process of the liquid crystal display device and a temperature 10° C. above the temperature applied to the optical device in the production process of the liquid crystal display device can remove ingredients which, if the previous heat treatment is not carried out, are removed from the optical device upon exposure to heat in the production process of the liquid crystal display device. Therefore, subsequent heating in the production of the liquid crystal display device does not pose a problem of layer thickness reduction or the like.

More preferably, the optical function layer is a retardation layer, the polymerizable liquid crystal material comprises a polymerizable liquid crystal monomer, and the liquid crystal regularity is nematic regularity, smectic regularity, or cholesteric regularity. When the optical device is a retardation layer laminate, previous heat treatment can minimize a change in retardation value. When the liquid crystal regularity is cholesteric regularity, the polymerizable liquid crystal material should contain a chiral dopant.

In this case, a construction may be adopted wherein the optical function layer is a cholesteric layer, the polymerizable liquid crystal material comprises a polymerizable liquid crystal monomer and a polymerizable chiral dopant, and the liquid crystal regularity is cholesteric regularity. When the optical device is the circularly polarized light controlling optical device, previous heat treatment can minimize a change in center reflection wavelength upon heating.

Further, a construction may be adopted wherein the polymerizable liquid crystal material comprises a polymerizable liquid crystal monomer and the molecule of the polymerizable liquid crystal monomer has a polymerizable functional group in its both ends.

Further, a construction may be adopted wherein the polymerizable liquid crystal material comprises a polymerizable liquid crystal monomer and a polymerizable chiral dopant and the molecule of the polymerizable chiral dopant has a polymerizable functional group in its both ends. When the molecule of the polymerizable chiral dopant has a polymerizable functional group in its both ends, both ends of adjacent molecules are bonded in a three-dimensional network manner, that is, polymerization in a three-dimensional network manner (crosslinking) takes place. As a result, an optical device having better heat resistance can be provided.

BEST MODE FOR CARRYING OUT THE INVENTION

Figure 1:
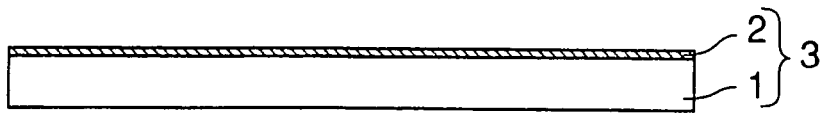
FIG. 1 is a diagram illustrating a step which is a part of the production process of an optical device according to the present invention, wherein numeral 1 designates a transparent substrate, numeral 2 an aligning film, and numeral 3 a supporting substrate.

The optical device according to the present invention will be first described, and a heat treatment method for providing the optical device according to the present invention will be then described.

<Optical Device>

The optical device according to the present invention is characterized by comprising a support and an optical function layer provided on the support and formed by curing a polymerizable liquid crystal material while retaining predetermined liquid crystal regularity, said optical device having been heat treated at a predetermined temperature, said optical function layer having a percentage reduction in layer thickness, defined by (A-B)/A, of not more than 5% wherein A represents the thickness of the optical function layer after the heat treatment and B represents the thickness of the optical function layer after reheating the optical device at said heat treatment temperature for 60 min.

Thus, in the present invention, when the percentage reduction in thickness of the optical function layer upon reheating at the same temperature as the heat treatment temperature for 60 min is in the above defined range, a change in various optical properties attributable to a change in layer thickness can be prevented. Therefore, the optical device according to the present invention can also be used in a production process in which heat is possibly applied. This can realize the development of the optical device to various applications. Regarding the predetermined heat treatment temperature, when the supporting substrate is, for example, a polymeric stretched film, which will be described later, the heat treatment temperature should be below the softening (deformation) temperature of the supporting substrate. For this reason, in this case, the heat treatment temperature is generally about 80 to 120° C. On the other hand, when the supporting substrate is, for example, a glass substrate, thermal decomposition of the optical function layer formed on the supporting substrate takes place at a temperature below the deformation temperature of the supporting substrate. For this reason, in this case, the heat treatment temperature is generally about 180 to 240° C.

The reason why the percentage reduction in thickness of the optical function layer in the optical device according to the present invention upon heating is small is believed to be as follows.

Specifically, in the conventional optical device using a polymerizable liquid crystal material, the polymerizable liquid crystal material has been polymerized and anchored or immobilized while retaining a predetermined liquid crystal structure, and, in this state, is used. In such a state that the polymerizable liquid crystal material has been polymerized to provide a polymeric material, there is a possibility that, in addition to the polymeric material having a liquid crystal structure, for example, the residue of the photopolymerization initiator and impurities produced at the time of the polymerization reaction, that is, products attributable to the photopolymerization initiator, are present. Such impurities are not chemically bonded to the main chain of the polymer formed as a result of the polymerization of the monomer or the like and thus are highly likely to be removed from within the optical function layer upon heating after the polymerization. When the material within the optical function layer is removed upon heating, the thickness of the optical function layer is of course reduced.

In the present invention, as described later, an optical device having an optical function layer, from which impurities have been previously removed, can be provided by previously heating the optical function layer at a predetermined temperature to remove impurities present within the optical function layer. Therefore, even when heat is applied later, a reduction in layer thickness can be kept in such a thickness reduction range that does not adversely affect the performance of the optical device.

The optical device according to the present invention undergoes no significant reduction in layer thickness upon heating and thus has the following function and effect.

Specifically, for example, when the optical function layer is a retardation layer, the thickness of the optical function layer is a value related to retardation value. On the other hand, when the optical device according to the present invention is used as a circularly polarized light controlling optical device and the optical function layer is a cholesteric layer (in the present invention, a layer within which a liquid crystal material having cholesteric regularity has been anchored is referred to as cholesteric layer), the center reflection wavelength of the cholesteric layer depends upon the layer thickness (helical pitch). That is, in this case, a change in layer thickness causes a change in helical pitch.

Therefore, when the thickness of the optical function layer is significantly reduced upon heating, the above important optical properties are disadvantageously significantly changed. In this case, when the optical device is used in an image display device, expected optical properties cannot be provided, making it difficult to use the optical device. In the optical device according to the present invention, since the percentage reduction in layer thickness upon heating is in the above range, the change in optical properties of the optical device upon heating can be significantly reduced. Therefore, the optical device according to the present invention can be advantageously satisfactorily used, for example, in image display devices which are highly likely to be exposed to heat in the production process thereof.

The above optical device will be described for each element.

1. Support

In the present invention, the support refers to a supporting substrate having an aligning ability. When the optical function layer is transferred by the step of transfer, the support refers to a receiving object, that is, an object for receiving the optical function layer.

<Supporting Substrate having Aligning Ability>

The optical device according to the present invention comprises a supporting substrate having an aligning ability and an optical function layer provided on the supporting substrate and formed by curing a polymerizable liquid crystal material while retaining predetermined liquid crystal regularity.

The supporting substrate having an aligning ability may be constituted by a substrate which as such has an aligning ability. Alternatively, the supporting substrate having an aligning ability may comprise an aligning film provided on a transparent substrate. The former will be described as a first embodiment, and the latter as a second embodiment.

(1) First Embodiment

In the first embodiment, a substrate per se has an aligning ability and constitutes the supporting substrate. Specifically, a stretched film may be mentioned as the supporting substrate in the first embodiment. When the stretched film is used, molecules of the liquid crystal material can be aligned along the direction of stretch. In this embodiment, what is required for providing a supporting substrate is only to provide a stretched film. Therefore, advantageously, this can highly simplify the step of providing a supporting substrate. The stretched film may be commercially available one. If necessary, stretched films of various materials may be formed.

Specific examples of films for stretched films include: films of polycarbonate-based polymeric materials, polyester-based polymeric materials such as polyallylate and polyethylene terephthalate, polyimide-based polymeric materials, polysulfone-based polymeric materials, polyether sulfone-based polymeric materials, polystyrene-based polymeric materials, polyolefin-based polymeric materials such as polyethylene and polypropylene, polyvinyl alcohol-based polymeric materials, cellulose acetate-based polymeric materials, polyvinyl chloride-based polymeric materials, polymethyl methacrylate-based polymeric materials or other thermoplastic polymers; and films of liquid crystal polymers.

In the present invention, among others, polyethylene terephthalate (PET) films are preferably used, for example, from the viewpoints of a broad effective stretch ratio range and high availability.

The stretch ratio of the stretched film used in the present invention is not particularly limited so far as the aligning ability can be developed. Therefore, even a biaxially stretched film can be used so far as the stretch ratio in one axis is different from that in the other axis.

The stretch ratio significantly varies depending upon materials used and is not particularly limited. However, in the present invention, the stretch ratio is generally about 150 to 300%, preferably 200 to 250%.

(2) Second Embodiment

In the second embodiment, the supporting substrate having an aligning ability comprises a transparent substrate and an aligning film provided on the transparent substrate.

The second embodiment is advantageous in that the direction of aligning can be selected from a relatively wide aligning direction range by selecting the aligning film. Further, various aligning directions can be realized by selecting the type of a coating liquid, for aligning film formation, to be coated onto the transparent substrate, and more effective aligning can be realized.

Aligning films commonly used, for example, in liquid crystal displays can be suitably used as the aligning film in this embodiment. In general, a polyimide-based or polyvinyl alcohol-based aligning film subjected to rubbing treatment is suitable. Photoaligning films may also be used.

The transparent substrate used in this embodiment is not particularly limited so far as the substrate is formed of a transparent material. Examples of transparent substrates include nonflexible transparent rigid materials, such as quartz glass, Pyrex (registered trademark) glass, and synthetic quartz plates, or flexible transparent materials, such as transparent resin films and optical resin plates.

<Receiving Object>

The receiving object used in the present invention may be properly selected depending upon applications of the optical device. In general, however, the use of a transparent material, that is, a transparent substrate, is suitable.

This transparent substrate may be the same as that described in the above column of "Supporting substrate having aligning ability," and, thus, the description thereof will be omitted.

2. Optical Function Layer

The optical device according to the present invention comprises the above supporting substrate and an optical function layer provided on the supporting substrate and formed by curing a polymerizable liquid crystal material while retaining predetermined liquid crystal regularity. The optical function layer comprises a polymerizable liquid crystal material which constitutes a polymeric material having liquid crystal regularity. In some cases, residues of additives, such as photopolymerization initiators, contained in a coating liquid for liquid crystal layer formation which will be described later are also contained in the optical function layer. The polymerizable liquid crystal material and the additives will be described.

<Polymerizable Liquid Crystal Material>

Polymerizable liquid crystal materials usable in the present invention include polymerizable liquid crystal monomers, polymerizable liquid crystal oligomers, and polymerizable liquid crystal polymeric materials. Polymerizable liquid crystal materials, which as such have nematic regularity or smectic regularity, are generally used. However, the polymerizable liquid crystal material is not particularly limited to these only and may have cholesteric regularity. In order to impart the cholesteric regularity, when the polymerizable liquid crystal material per se has nematic regularity or smectic regularity, a polymerizable chiral dopant may be further used. The polymerizable liquid crystal material and the polymerizable chiral dopant will be described.

(1) Polymerizable Liquid Crystal Material

As described above, polymerizable liquid crystal materials usable in the present invention include polymerizable liquid crystal monomers, polymerizable liquid crystal oligomers, and polymerizable liquid crystal polymeric materials. The polymerizable liquid crystal material is not particularly limited so far as, when the polymerizable liquid crystal material per se has formed a liquid crystal phase, the liquid crystal phase has nematic regularity, smectic regularity, or cholesteric regularity. The presence of a polymerizable functional group at both ends of the molecule is preferred from the viewpoint of the production of a highly heat resistant optical device.

Examples of such polymerizable liquid crystal materials include compounds (I) represented by formula (1) and compounds which will be described later. A mixture of two compounds covered by formula (1) may also be used as compound (I).

The polymerizable liquid crystal material may also be a mixture of two or more compounds covered by formula (1) and the compounds which will be described later.

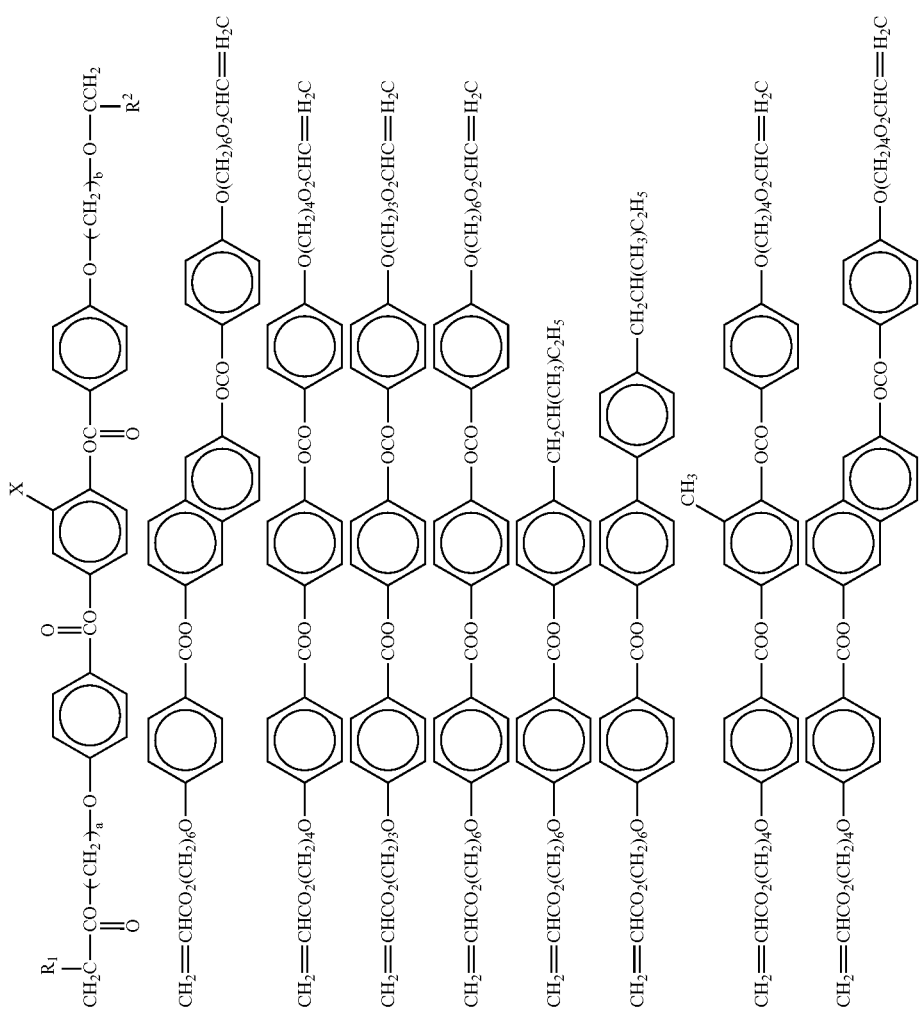

-continued
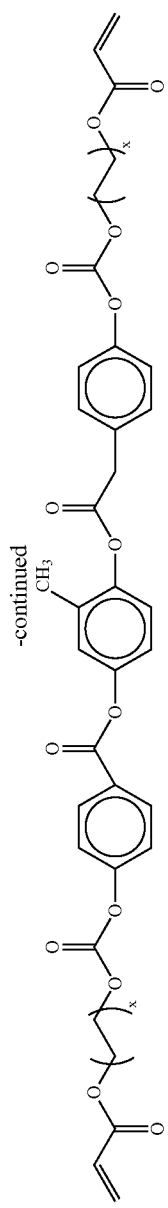
x = integer of 2 to 5

In formula (1) which represents compound (I), $R^1$ and $R^2$ each represent a hydrogen atom or a methyl group, and X preferably represents a chlorine atom or a methyl group. a and b showing the chain length of the alkylene group as a spacer of compound (I) are preferably in the range of 2 to 9 from the viewpoint of developing liquid crystallinity.

In the above embodiment, examples of polymerizable liquid crystal monomers have been described. In the present invention, however, for example, polymerizable liquid crystal oligomers and polymerizable liquid crystal polymeric materials may also be used. Conventional polymerizable liquid crystal oligomers and polymerizable liquid crystal polymeric materials may be properly selected and used.

(2) Chiral Dopant

In the present invention, when the above optical device is a circularly polarized light controlling optical device, that is, when the optical function layer is a cholesteric layer and the polymerizable liquid crystal material has nematic regularity or smectic regularity, a chiral dopant should be added in addition to the polymerizable liquid crystal material.

The polymerizable chiral dopant used in the present invention refers to a low-molecular compound which has an optically active site and a molecular weight of not more than 1,500. The chiral dopant is mainly used for inducing a helical pitch in positive uniaxial nematic regularity developed by compound (I). So far as this object can be attained, any low-molecular compound may be used as the chiral dopant without particular limitation. Specifically, any low-molecular compound may be used so far as the compound is compatible in a solution or melted state with compound (I) or the above compound, does not sacrifice the liquid crystallinity of the polymerizable liquid crystal material, which can have nematic regularity, and can induce a desired helical pitch in the nematic regularity. The presence of a polymerizable functional group at both ends of the molecule is preferred from the viewpoint of providing highly heat resistant optical device. For the chiral dopant used for inducing a helical pitch in the liquid crystal, any chirality should be found at least in the molecule. The chiral dopant having an optically active site incorporated in the liquid crystalline composition according to the present invention is preferably a chiral dopant which is significantly effective in inducing a helical pitch in the nematic regularity. Specifically, the use of low-molecular compounds (II) represented by formula (2), (3), or (4), which have axial asymmetry in their molecule, is preferred.

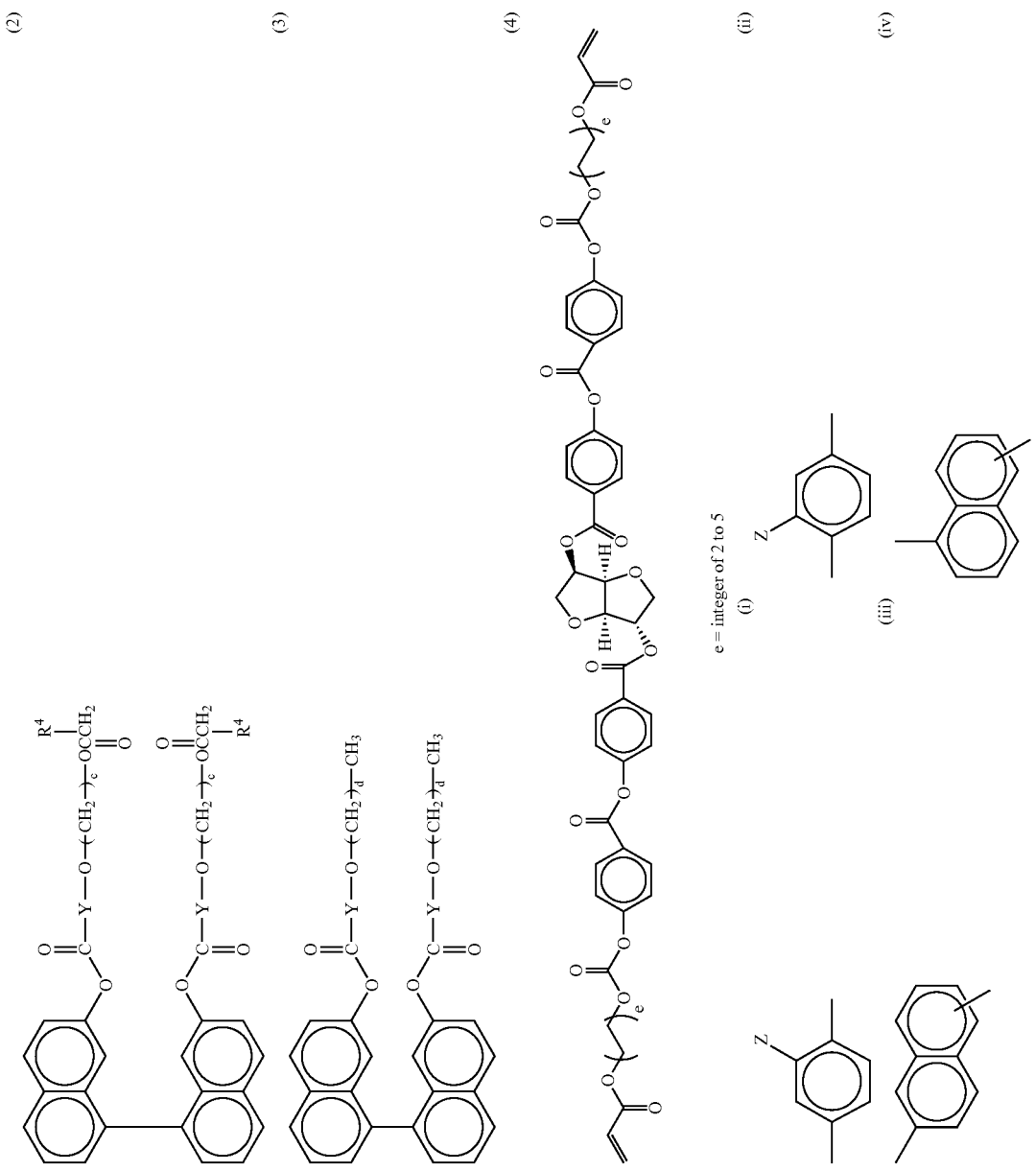

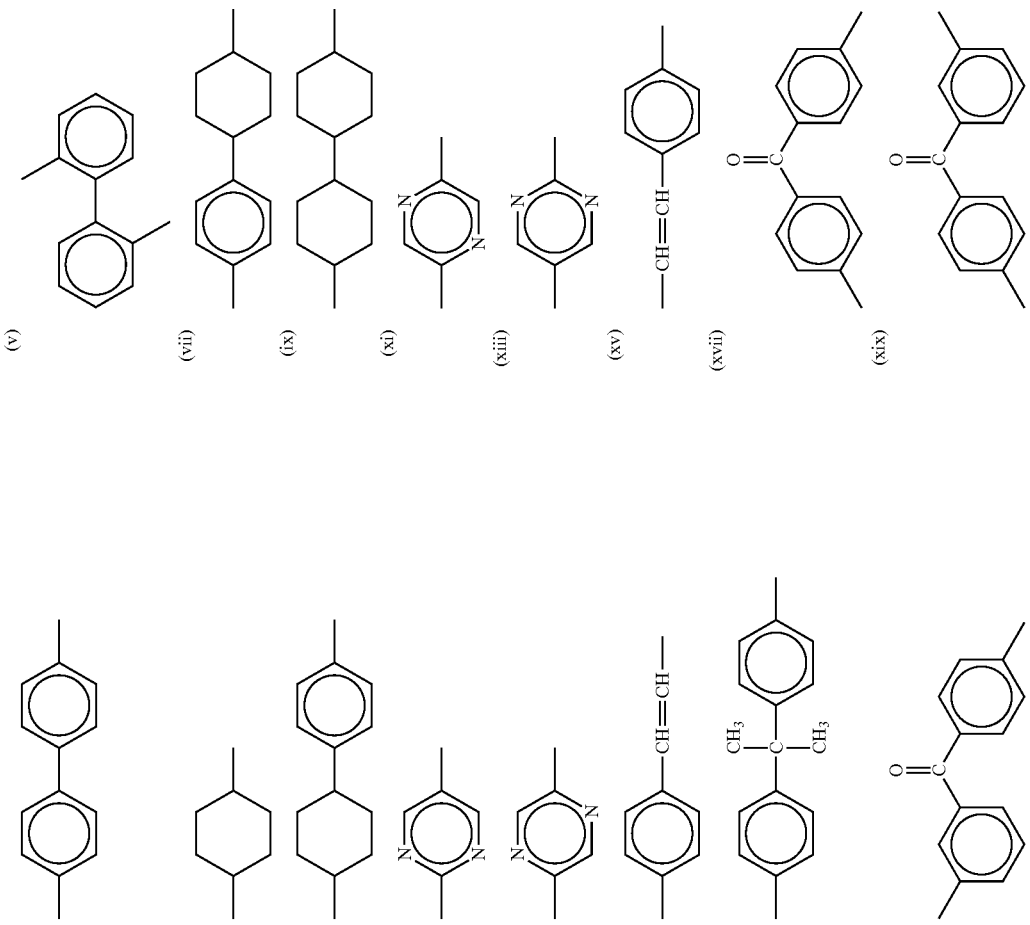

-continued
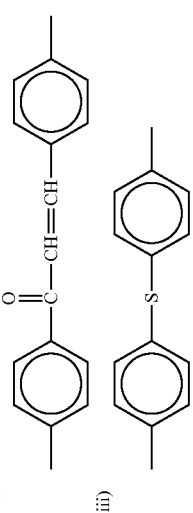
(xxi)
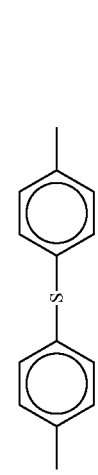
(xxiii)
(xxii)
(xxiv)
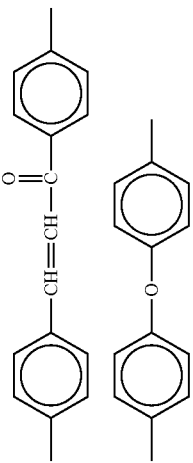

In formula (2), (3), or (4) which represents chiral dopant (II), $R^4$ represents a hydrogen atom or a methyl group. Y represents any one of formulae (i) to (xxiv), preferably any one of formulae (i), (ii), (iii), (v), and (vii). c and d, which represent the chain length of the alkylene group, are preferably in the range of 2 to 9. When c and d are less than 2 or not less than 10, the liquid crystallinity is less likely to be developed.

The optimal amount of the chiral dopant incorporated in the polymerizable liquid crystal material according to the present invention is determined by taking into consideration the helical pitch inducing ability and the cholesteric nature of the finally obtained circularly polarized light controlling optical device. Specifically, although the amount of the chiral dopant incorporated significantly varies depending upon the polymerizable liquid crystal material used, the amount of the chiral dopant may be in the range of 1 to 20 parts by mass based on 100 parts by mass in total of the polymerizable liquid crystal material. When the amount of the chiral dopant incorporated is below the lower limit of the above-defined amount range, in some cases, satisfactory cholesteric nature cannot be imparted to the polymerizable liquid crystal material. On the other hand, when the amount of the chiral dopant incorporated is above the upper limit of the above-defined amount range, the alignment of molecules is inhibited. This possibly adversely affects curing by the application of an actinic radiation.

In the present invention, the chiral dopant is not necessarily polymerizable. When the heat stability and the like of the optical function layer are taken into consideration, however, the use of a polymerizable chiral dopant, which can be polymerized with the polymerizable liquid crystal material to anchor the cholesteric regularity, is preferred. In particular, the presence of a polymerizable functional group at both ends of the molecule is preferred from the viewpoint of providing highly heat resistant optical devices.

<Photopolymerization Initiator>

In the present invention, a photopolymerization initiator is preferably added to the polymerizable liquid crystal material. For example, when the polymerizable liquid crystal material is polymerized by electron beam irradiation, the use of a photopolymerization initiator is in some cases unnecessary. In the case of a generally used curing method, for example, curing by ultraviolet (UV) irradiation, a photopolymerization initiator is generally used for polymerization acceleration purposes.

In addition to the photopolymerization initiator, a sensitizer may be added in such an amount range that is not detrimental to the object of the present invention.

The photopolymerization initiator may be generally added in an amount of 0.5 to 10% by mass to the polymerizable liquid crystal material according to the present invention.

3. Liquid Crystal Regularity

In the present invention, an optical function layer formed by curing the polymerizable liquid crystal material while retaining predetermined liquid crystal regularity is used.

Nematic regularity, smectic regularity, and cholesteric regularity may be mentioned as the liquid crystal regularity. When the optical device is a retardation layer laminate, the optical function layer has nematic regularity or smectic regularity. On the other hand, when the optical device is a circularly polarized light controlling optical device, the optical function layer has cholesteric regularity.

The regularity is basically determined by liquid crystal regularity, which the polymerizable liquid crystal material per se develops, and whether or not a chiral dopant is used.

The liquid crystal regularity can be provided by forming, on a supporting substrate having an aligning ability, a layer, for liquid crystal layer formation, comprising the above polymerizable liquid crystal material and an optional polymerizable chiral dopant and allowing the molecules of the liquid crystal to align along the aligning ability of the supporting substrate. The liquid crystal layer can be converted to an optical function layer by applying an actinic radiation to the liquid crystal layer in such a state that the liquid crystal regularity is retained, thereby curing the liquid crystal layer.

4. Percentage Reduction in Thickness of Optical Function Layer Upon Heating

The present invention is characterized in that the percentage reduction in thickness of the above optical function layer, when heated for 60 min at the same temperature as applied in the heat treatment of the optical device, is not more than 5%, preferably not more than 3%, particularly preferably not more than 1%. For example, in the case where the optical device is a phase difference plate or a circularly polarized light controlling optical device, when the percentage reduction in layer thickness is in this range, there is no fear of causing a significant change in retardation value or center reflection wavelength, which are important optical properties of the optical device, even upon heating of image display devices or the like using the optical device in the production thereof. Therefore, the optical device according to the present invention can be used even in the case where the optical device is exposed to heat in a step after mounting the optical device.

5. Specific Embodiments of Optical Device

Specific embodiments of the optical device according to the present invention include a retardation layer laminate comprising a retardation layer as the optical function layer and a circularly polarized light controlling optical device comprising a cholesteric layer as the optical function layer. The retardation layer laminate and the circularly polarized light controlling optical device will be described.

<Retardation Layer Laminate>

In the present invention, when the optical device is a retardation layer laminate, the retardation layer laminate may comprise a support and a retardation layer provided on the support and formed by curing a polymerizable liquid crystal material while retaining nematic regularity, smectic regularity, or cholesteric regularity, wherein the percentage change in retardation value of the retardation layer, when heated for 60 min at the same temperature as the predetermined temperature in the heat treatment, is not more than 5%, preferably not more than 3%, particularly preferably not more than 1%.

Thus, in the optical device according to the present invention, the change in layer thickness upon heating is so small that, when the optical device is used as a retardation layer laminate, the change in retardation value upon exposure of the retardation layer laminate to heat is advantageously very small.

The retardation layer laminate according to the present invention, when exposed to heat, undergoes only a very small change in retardation value. Therefore, the laminate can be used even in the case where, after the incorporation of the retardation layer laminate, heat treatment should be carried out, for example, for the formation of an ITO film.

This is advantageous in that the utilization range of the retardation layer laminate according to the present invention can be greatly expanded.

A suitable retardation layer may be formed by dissolving the liquid crystal material comprising a polymerizable liquid crystal monomer and a photopolymerization initiator in a solvent to prepare a solution, coating the solution, and curing the coating. In this case, the polymerizable liquid crystal monomer and the photopolymerization initiator may be those as described above.

The other construction is the same as described above, and, thus, the description thereof will be omitted.

<Circularly Polarized Light Controlling Optical Device>

In the present invention, when the optical device is a circularly polarized light controlling optical device, the circularly polarized light controlling optical device may comprise a support and a cholesteric layer provided on the support and formed by curing a polymerizable liquid crystal material while retaining cholesteric regularity, wherein the percentage change in center reflection wavelength of the cholesteric layer, when heated for 60 min at the same temperature as the predetermined temperature in the heat treatment, is not more than 5%, preferably not more than 3%, particularly preferably not more than 1%.

Also in this case, since the change in layer thickness is associated with the change in center reflection wavelength of the cholesteric layer, when the optical device is used as a circularly polarized light controlling optical device, the change in center reflection wavelength can be made very small even upon heating of an image display device using the optical device in the production thereof.

In the circularly polarized light controlling optical device, as described above, the change in center reflection wavelength upon heating is so small that the circularly polarized light controlling optical device according to the present invention can be used even in the case where, after the incorporation of the circularly polarized light controlling optical device, for example, as a color filter, in an image processing device, heat treatment should be carried out, for example, for the formation of an ITO film. This is advantageous in that the utilization range of the circularly polarized light controlling optical device can be greatly expanded.

A suitable cholesteric layer in the circularly polarized light controlling optical device may be formed by dissolving a liquid crystal material comprising a polymerizable liquid crystal monomer, a polymerizable chiral dopant, and a photopolymerization initiator in a solvent to prepare a solution, coating the solution, and curing the coating. In this case, the polymerizable liquid crystal monomer, the polymerizable chiral dopant, and the photopolymerization initiator may be those as described above.

The other construction is the same as described above, and, thus, the description thereof will be omitted.

<Heat Treatment Method>

The method for heat treating an optical device according to the present invention is characterized by heat treating an optical device, comprising a supporting substrate and an optical function layer provided on the supporting substrate and formed by curing a polymerizable liquid crystal material while retaining predetermined liquid crystal regularity, at a temperature falling within a predetermined temperature range or by heat treating the optical device at or above a temperature which corresponds to an isotropic layer before polymerizing the polymerizable liquid crystal material, thereby imparting heat resistant to the optical device. In this case, preferably, the heat treatment is carried out for 10 to 60 min. This heat treatment can move the liquid crystal component or the chiral component, which remains uncured or does not form a satisfactory three-dimensional network structure, to a stable state (position) within the layer.

In the method for heat treating an optical device according to the present invention, the heat treatment is previously carried out at a predetermined temperature, and impurities within the optical function layer are removed by this heat treatment. Therefore, even when heating is carried out in a later stage, that is, even when, after mounting the optical device subjected to the heat treatment according to the present invention, heating is carried out, for example, in an image processing device for the formation of a transparent electrode, since the heat treatment is previously carried out, there is no change in layer thickness of the optical device. Consequently, there is no fear of causing a change in various optical functions associated with the layer thickness. Thus, in mounting the heat treated optical device, for example, on an image processing device, there is no restriction on mounting position and mounting timing. This offers an advantage that the degree of freedom in the production of an image processing device and the degree of freedom in product design can be significantly improved.

The production process of an optical device according to the present invention including the above heat treatment method will be described.

FIGS. 1 to 6 show an embodiment of the production process of an optical device according to the present invention.

In this embodiment, a supporting substrate 3 having an aligning ability is first provided. The supporting substrate 3 comprises a transparent substrate 1 and an aligning film 2 provided on the transparent substrate 1 (step of providing supporting substrate, see FIG. 1).

Figure 2:
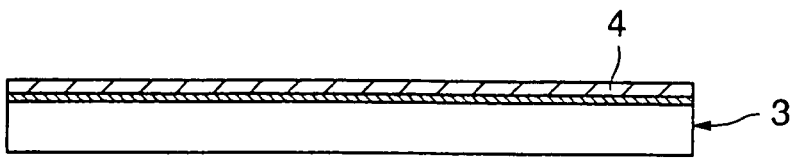
FIG. 2 is a diagram illustrating a step which is a part of the production process of an optical device according to the present invention, wherein numeral 4 designates a liquid crystal layer.

Next, a coating liquid for liquid crystal layer formation prepared by dissolving a polymerizable liquid crystal material and a photopolymerization initiator in a solvent is coated onto the supporting substrate 3 having an aligning ability, the coating is dried to remove the solvent, and the coating is kept at a temperature suitable for developing a liquid crystal phase to form a liquid crystal layer 4 (step of forming liquid crystal layer, see FIG. 2). By virtue of the action of the aligning film 2, the liquid crystal layer has liquid crystal regularity.

Figure 3:
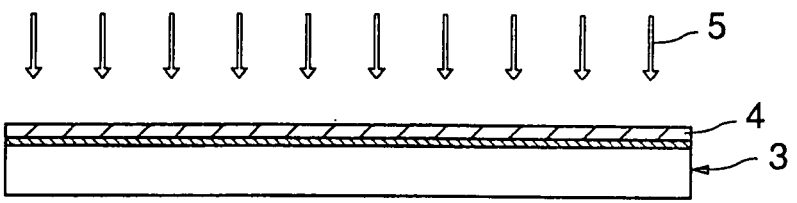
FIG. 3 is a diagram illustrating a step which is a part of the production process of an optical device according to the present invention, wherein numeral 5 designates ultraviolet irradiation.
Figure 4:
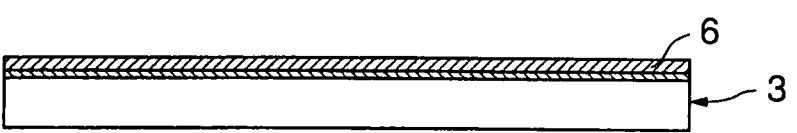
FIG. 4 is a diagram illustrating a step which is a part of the production process of an optical device according to the present invention, wherein numeral 6 designates an optical function layer.

Upon the application of ultraviolet light 5 to the liquid crystal layer 4 having liquid crystal regularity, the polymerizable liquid crystal material in the liquid crystal layer is polymerized by radicals generated from the photopolymerization initiator to convert the liquid crystal layer 4 to an optical function layer 6 (step of forming optical function layer, see FIGS. 3 and 4).

Figure 5:
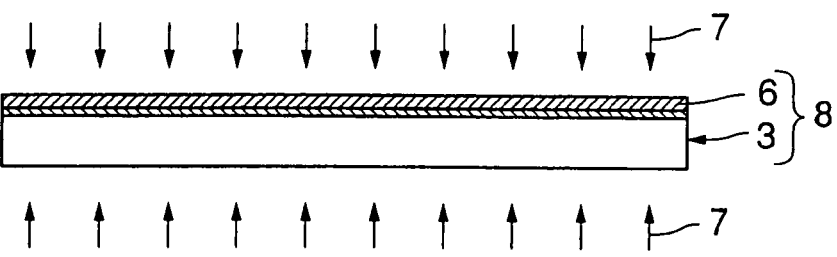
FIG. 5 is a diagram illustrating a step which is a part of the production process of an optical device according to the present invention, wherein numeral 7 designates heat and numeral 8 an optical device.

The optical device 8 comprising the optical function layer 6 provided on the supporting substrate 3 is then kept, for example, in an oven at a predetermined temperature, whereby heat 7 is applied to the optical device 8 for heat treatment (step of heat treatment, see FIG. 5).

Figure 6:
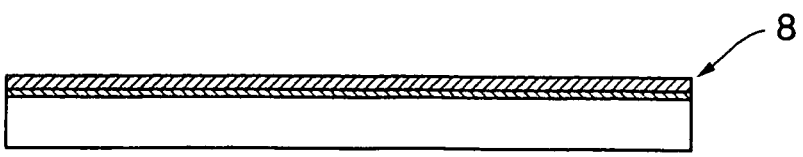
FIG. 6 is a diagram illustrating a step which is a part of the production process of an optical device according to the present invention.

The heat treated optical device 8 thus obtained has dimensional stability against heat and, in its turn, is stable in various optical functions (see FIG. 6).

The production process of an optical device according to the present invention will be described together with the detailed description of the heat treatment method according to the present invention.

1. Step of Providing Supporting Substrate

In the production of the optical device according to the present invention, a supporting substrate having an aligning ability should be first provided. The supporting substrate having an aligning ability may be constituted by a substrate which as such has an aligning ability. Alternatively, as shown in FIG. 1, the supporting substrate 3 having an aligning ability may comprise an aligning film 2 provided on a transparent substrate 1. These are the same as those described above in the column of <Optical device>, and the description thereof will be omitted.

2. Step of Forming Liquid Crystal Layer

In the present invention, as shown in FIG. 2, a liquid crystal layer 4 is formed on the supporting substrate 3 having an aligning ability.

In the present invention, the liquid crystal layer is formed of a polymerizable liquid crystal material and is not particularly limited so far as the liquid crystal layer can take liquid crystal phases having various types of liquid crystal regularity.

The liquid crystal layer may be formed, for example, by the following method. Specifically, a layer for liquid crystal layer formation is generally formed by dissolving a polymerizable liquid crystal material, such as a polymerizable monomer, and optional additives, such as a chiral dopant and a photopolymerization initiator, in a solvent to prepare a coating liquid for liquid crystal layer formation and coating the coating liquid.

Coating methods usable herein include spin coating, roll coating, slide coating, printing, dipping/pulling-up coating, and curtain coating (die coating).

After the formation of the layer for liquid crystal layer formation, the solvent is removed to form a liquid crystal layer having various types of liquid crystal regularity. Methods usable for removing the solvent include, for example, removal under reduced pressure or removal by heating, and a combination of these methods.

In the present invention, the method for forming a liquid crystal layer is not limited to the above method using the coating liquid for liquid crystal layer formation. For example, a method may be adopted wherein a dry film formed of a liquid crystal material is laminated on a supporting substrate having an aligning ability and the laminate is then heated to impart liquid crystal regularity. In the present invention, however, for example, from the viewpoint of easy process, the above method using the coating liquid for liquid crystal layer formation is preferred.

The polymerizable liquid crystal material, the chiral dopant, and the photopolymerization initiator used in the coating liquid for liquid crystal layer formation are the same as those described above in the column of <Optical device>, and the description thereof will be omitted. The solvent and other additives used in the coating liquid for liquid crystal layer formation will be described.

<Solvent>

The solvent usable in the coating liquid for liquid crystal layer formation is not particularly limited so far as the solvent can dissolve the polymerizable liquid crystal material and the like and is not detrimental to the aligning ability on the supporting substrate having an aligning ability.

The use of a single solvent sometimes results in unsatisfactory solubility of the polymerizable liquid crystal material and the like or, as described above, results in the attack of the supporting substrate having an aligning ability. The use of a mixture of two or more solvents, however, can avoid such troubles. Suitable concentration of the polymerizable liquid crystal material in the solution varies depending upon the solubility of the liquid crystalline composition and the film thickness of the circularly polarized light controlling optical device to be produced and thus cannot be unconditionally specified. However, the concentration of the polymerizable liquid crystal material in the solution is generally in the range of 5 to 60% by mass.

A surfactant and the like may be added for coatability improvement purposes to the coating liquid for liquid crystal layer formation.

The amount of the surfactant added is generally in the range of 0.01 to 1% by mass based on the liquid crystalline composition contained in the solution, although the amount of the surfactant added varies depending upon the type of the surfactant, the type of the polymerizable liquid crystal material, the type of the solvent, and the type of the supporting substrate having an aligning ability to be coated with the solution.

3. Step of Forming Optical Function Layer

In the present invention, upon the application of an actinic radiation to a liquid crystal layer, composed mainly of a polymerizable liquid crystal material, formed in the step of forming a liquid crystal layer, the liquid crystal layer is cured in such a state that liquid crystal regularity is retained. Thus, optical function layers having various optical functions can be formed.

The actinic radiation applied at that time is not particularly limited so far as the actinic radiation can polymerize the polymerizable liquid crystal material, the polymerizable chiral dopant and the like. In general, however, light with a wavelength of 250 to 450 nm is applied.

The irradiation intensity may be properly regulated depending upon the composition of the polymerizable liquid crystal material constituting the liquid crystal layer and the amount of the photopolymerization initiator.

4. Step of Transfer

In the production process according to the present invention, if necessary, the step of transferring the optical function layer, provided on the supporting substrate having an aligning ability, onto a receiving object may be provided after the step of forming an optical function layer.

The step of transfer may be carried out according to need, for example, in the case where the optical function layer is used in combination with other layer(s) or in the case where, although the optical function layer is preferably formed on a nonflexible supporting substrate, the optical function layer is intended to be used in such a state that the optical function layer is provided on the surface of a flexible film.

The transfer is carried out by bringing the surface of the receiving object into contact with the surface of the optical function layer formed in the step of forming an optical function layer (see FIGS. 2 and 3).

Transfer methods usable herein include, for example, a method wherein an adhesive layer is previously formed on the surface of the receiving object or the surface of the optical function layer and the optical function layer is transferred by taking advantage of the adhesive power, and a method wherein the aligning film or the like in the supporting substrate is rendered easily separable.

Further methods effective for the transfer include a method wherein the optical function layer is formed so that the hardness of the surface of the optical function layer on its side, with which the receiving object comes into contact, is lower than the hardness of the surface of the optical function layer on its supporting substrate side and the optical function layer is transferred from this assembly onto the receiving object, and a method wherein the optical function layer is formed so that the percentage residual double bond in the surface of the optical function layer on its receiving object side is higher than that in the surface of the optical function layer on its supporting substrate side and the optical function layer is transferred from this assembly onto the receiving object. The degree of polymerization on the surface side of the optical function layer can be made lower than that on the substrate side, for example, by using a photopolymerization initiator, which has such oxygen dependency that causes a lowering in polymerization rate in the presence of oxygen, in the polymerizable liquid crystal material and conducting polymerization under conditions such that oxygen comes into contact with only the surface side of the optical function layer.

The receiving object used in this step may be properly selected depending upon applications of the optical device. In general, however, the use of a transparent material, that is, a transparent substrate, is suitable.

This transparent substrate may be the same as that described in the above column of "Supporting substrate having aligning ability," and, thus, the description thereof will be omitted.

5. Step of Heat Treatment

The present invention is characterized in that the step of heat treatment is carried out after the step of forming an optical function layer, and the method for heat treating an optical device according to the present invention includes the heat treatment method in this step.

Specifically, the heat treatment of the optical device according to the present invention is characterized in that the optical device comprising the support and the optical function layer provided on the support and formed in the step of forming an optical function layer is heat treated at a predetermined temperature. As described above, when the support is, for example, a polymeric stretched film, the heat treatment temperature is preferably in the range of about 80 to 120° C., more preferably in the range of 90 to 120° C., still more preferably in the range of 90 to 110° C. On the other hand, when the support is, for example, a glass substrate, the heat treatment temperature is preferably in the range of about 180 to 240° C., more preferably in the range of 190 to 230° C., still more preferably in the range of 200 to 220° C.

The above temperature is generally determined by taking into consideration the heating temperature applied, for example, in the formation of an ITO electrode or in the formation of a polyimide film as an aligning film in the production of an image processing device. Specifically, stable film thickness and, in its turn, stable various functions of the optical device associated with the film thickness at the temperature applied in the production process of the image processing device are required of the optical device to be heat treated. Accordingly, the heat treatment is preferably carried out at a temperature between at least the temperature applied in the production process of an image processing device, to which the optical device is used, and a temperature at least 10° C. above the temperature applied in the production process of the image processing device.

In the present invention, the heat treatment is carried out at the above temperature for 10 to 60 min, preferably 15 to 45 min, particularly preferably 20 to 40 min.

The heat treatment time may be such that internal impurities can be removed. From this viewpoint, the heat treatment is carried out for the above time period range.

The heat treatment may be carried out in conventional heat treatment equipment such as an oven.

In the present invention, the polymerizable liquid crystal material preferably contains a photopolymerization initiator.

This is because, as described above, the change in thickness of the optical function layer upon heating is minimized by preventing a lowering in the layer thickness caused by the removal of impurities having no chemical bond to the main chain present within the optical function layer at the time of heating. Therefore, when residues such as photopolymerization initiators are previously present within the optical function layer, the advantage of the heat treatment method according to the present invention can be utilized best.

The above heat treatment method is effective particularly in a retardation layer laminate wherein the optical function layer is a retardation layer. A change in thickness of the retardation layer upon heating in the production process of an image display device results in a significant change in retardation value of the retardation layer. The change in retardation value of the retardation layer disadvantageously poses a severe problem associated with optical design, and the retardation layer laminate, which causes a change in retardation value, cannot generally be used.

In the heat treatment method according to the present invention, by virtue of the above previous heat treatment, the change in retardation value can be minimized even upon exposure of the retardation layer to heat, for example, in the production process of an image processing device. Therefore, in the production process, the optical device can be used even when heat is applied. This can advantageously significantly expand applications of the retardation layer laminate.

Further, the heat treatment method is also effective particularly for a circularly polarized light controlling optical device wherein the optical function layer is a cholesteric layer. In this cholesteric layer, the center reflection wavelength depends upon the layer thickness. Therefore, in the cholesteric layer as with the retardation layer, the center reflection wavelength, which is an important optical property, does not undergo a change even upon heating in the production of the circularly polarized light controlling optical device. This can advantageously significantly expand applications of the circularly polarized light controlling optical device.

It should be noted that the present invention is not limited to the above embodiments. The above embodiments are illustrative only, and variations and modifications fall within the technical scope of the present invention so far as they have substantially the same construction as and the same function and effect as the technical idea described in the claims of the present invention.

EXAMPLES

The following examples further illustrate the present invention.

A. Cholesteric Layer (Preparation of Coating Liquid for Liquid Crystal Layer Formation)

A powder of a 100:5:5 (% by mass) mixture of a polymerizable liquid crystal material, a chiral dopant, and a photopolymerization initiator was dissolved at a concentration of 30% by mass in toluene to prepare a coating liquid for liquid crystal layer formation. The polymerizable liquid crystal material, the chiral dopant, and the photopolymerization initiator used were as follows.

Polymerizable liquid crystal material: A polymerizable liquid crystal monomer represented by formula (5) which has a polymerizable functional group in its ends and exhibits nematic liquid crystallinity at 50 to 100° C.

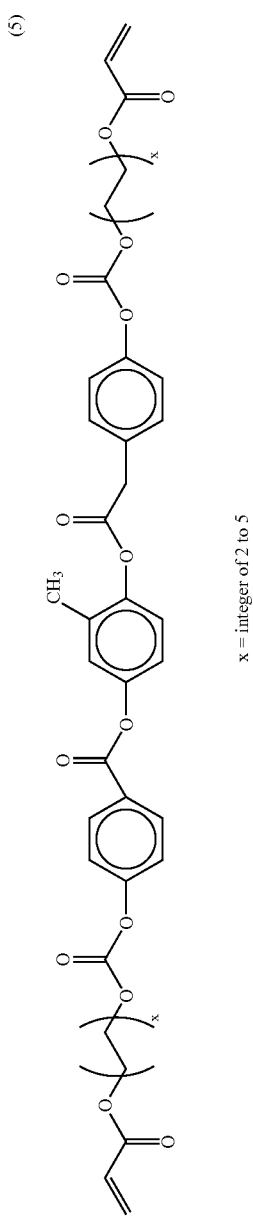

Chiral dopant: A polymerizable chiral dopant produced by attaching acrylate to both ends of a mesogen of a compound represented by formula (6) through a spacer to render the compound polymerizable

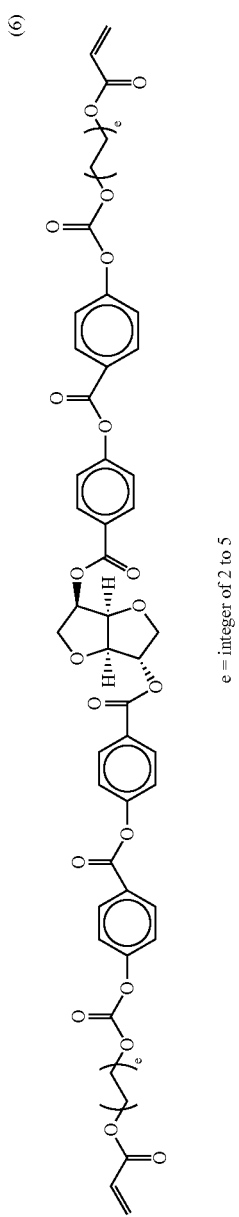

Photopolymerization initiator: IRG 907 (tradename, manufactured by Ciba Specialty Chemicals, K.K.)

(Formation of Aligning Film)

Next, a solution for the formation of an aligning film composed mainly of polyimide was spin coated onto a 0.7 mm-thick glass substrate. The solvent was evaporated, and the coating was then post-baked at 200° C., followed by rubbing by a conventional method to form an aligning film.

Separately, a solution for the formation of an aligning film composed mainly of polyvinyl alcohol was bar coated onto a 75 μm-thick TAC film. The solvent was evaporated, and the coating was then post-baked at 100° C., followed by rubbing by a conventional method to form an aligning film.

(Formation of Cholesteric Layer)

The above coating liquid for liquid crystal layer formation was spin coated onto the aligning film of the polyimide. The solvent was then evaporated. Thereafter, liquid crystal molecules were aligned under conditions of 80° C. and 3 min, and selective reflection characteristic of a cholesteric structure could be confirmed. Ultraviolet light (UV) was then applied to the coating to cause polymerization, thereby forming a cholesteric layer. Thus, sample 1 was prepared.

Separately, the above coating liquid for liquid crystal layer formation was bar coated onto the aligning film of polyvinyl alcohol. The solvent was then evaporated. Thereafter, liquid crystal molecules were aligned under conditions of 80° C. and 3 min, and selective reflection characteristic of a cholesteric structure could be confirmed. Ultraviolet light (UV) was then applied to the coating to cause polymerization, thereby forming a cholesteric layer. Thus, sample 2 was prepared.

For sample 1 thus obtained, a part of the sample was heat treated at 200° C. for 60 min, was then self-cooled to room temperature, and was allowed to stand for one day (Example 1), while the other part of the sample was not heat treated (Comparative Example 1).

For sample 2 thus obtained, a part of the sample was heat treated at 100° C. for 60 min, was then self-cooled to room temperature, and was allowed to stand for one day (Example 2), while the other part of the sample was not heat treated (Comparative Example 2).

(Evaluation)

The sample of Example 1 and the sample of Comparative Example 1 were measured for selective reflection center wavelength, were then heated at 200° C. for 60 min, and were again measured for selective reflection center wavelength, and the percentage change in center wavelength, that is, the percentage difference in center wavelength between the sample before the heat treatment and the sample after the heat treatment, was determined. The results were as follows.

Example 1

1% Change to Shorter Wavelength Side

Comparative Example 1

6% Change to Shorter Wavelength Side

The sample of Example 2 and the sample of Comparative Example 2 were measured for selective reflection center wavelength, were then heated at 100° C. for 60 min, and were again measured for selective reflection center wavelength. The percentage change in center wavelength was determined as described above. The results were as follows.

Example 2

1% Change to Shorter Wavelength Side

Comparative Example 2

6% Change to Shorter Wavelength Side

B. Retardation Layer 1

(Preparation of Coating Liquid for Liquid Crystal Layer Formation and Formation of Aligning Film)

A coating liquid for liquid crystal layer formation was prepared in the same manner as in the above item A, except that any chiral dopant was not used and the mixing ratio of the polymerizable liquid crystal material to the photopolymerization initiator was 100: 5 (% by mass). Further, an aligning film was formed in the same manner as in the above item A.

(Formation of retardation layer)

The coating liquid for liquid crystal layer formation was spin coated or bar coated on the above aligning film. The solvent was then evaporated. Thereafter, liquid crystal molecules were nematically aligned under conditions of 80° C. and 3 min. Ultraviolet light (UV) was then applied to the coating to cause polymerization, thereby forming a retardation layer 1. Thus, samples 3 and 4 were prepared.

For sample 3 having a nematic structure thus obtained, a part of the sample was heat treated at 200° C. for 60 min, was then self-cooled to room temperature, and was allowed to stand for one day (Example 3), while the other part of the sample was not heat treated (Comparative Example 3). Further, for sample 4 thus obtained, a part of the sample was heat treated at 100° C. for 60 min, was then self-cooled to room temperature, and was allowed to stand for one day (Example 4), while the other part of the sample was not heat treated (Comparative Example 4).

(Evaluation)

The sample of Example 3 and the sample of Comparative Example 3 were measured for retardation value, were then heated at 200° C. for 60 min, and were again measured for retardation value, and the percentage change in retardation value, that is, the percentage difference in retardation value between the sample before the heat treatment and the sample after the heat treatment, was determined. The results were as follows.

Example 3

1% Change in Retardation Value

Comparative Example 3

6% Change in Retardation Value

The sample of Example 4 and the sample of Comparative Example 4 were measured for retardation value, were then heated at 100° C. for 60 min, and were again measured for retardation value. The percentage change in retardation value was determined in the same manner as described above. The results were as follows.

Example 4

1% Change in Retardation Value

Comparative Example 4

6% Change in Retardation Value

C. Retardation Layer 2
(Preparation of Coating Liquid for Liquid Crystal Layer Formation and Formation of Aligning Film)

A coating liquid for liquid crystal layer formation was prepared in the same manner as in the above item A, except that the mixing ratio among the polymerizable liquid crystal material, the chiral dopant, and the photopolymerization initiator was 100:15:5 (% by mass). Further, an aligning film was formed in the same manner as in the above item A.

(Formation of Retardation Layer)

The coating liquid for liquid crystal layer formation was spin coated on the aligning film of polyimide. The solvent was then evaporated. Thereafter, liquid crystal molecules were aligned under conditions of 80° C. and 3 min. Ultraviolet light (UV) was then applied to the coating to cause polymerization, thereby forming a cholesteric layer. Thus, sample 5 was prepared. Since the content of the chiral dopant component in the above coating liquid for liquid crystal layer formation was higher than that in the coating liquid for liquid crystal layer formation used in Example 1, the selective reflection center wavelength of the sample 5 thus prepared was in the ultraviolet region. The retardation layer 2 thus formed could function as a negative phase difference compensating plate.

The above coating liquid for liquid crystal layer formation was bar coated onto the aligning film of polyvinyl alcohol. The solvent was then evaporated. Thereafter, liquid crystal molecules were aligned under conditions of 80° C. and 3 min. UV was then applied to the coating to cause polymerization, thereby forming a cholesteric layer. Thus, sample 6 was prepared. Also for sample 6, the selective reflection center wavelength was in the ultraviolet region.

For sample 5 having a cholesteric structure thus obtained, a part of the sample was heat treated at 200° C. for 60 min, was then self-cooled to room temperature, and was allowed to stand for one day (Example 5), while the other part of the sample was not heat treated (Comparative Example 5). Further, for sample 6 thus obtained, a part of the sample was heat treated at 100° C. for 60 min, was then self-cooled to room temperature, and was allowed to stand for one day (Example 6), while the other part of the sample was not heat treated (Comparative Example 6).

(Evaluation)

The sample of Example 5 and the sample of Comparative Example 5 were measured for retardation value, were then heated at 200° C. for 60 min, and were again measured for retardation value, and the percentage change in retardation value, that is, the percentage difference in retardation value between the sample before the heat treatment and the sample after the heat treatment, was determined. The results were as follows.

Example 5

1% Change in Retardation Value

Comparative Example 5

6% Change in Retardation Value

The sample of Example 6 and the sample of Comparative Example 6 were measured for retardation value, were then heated at 100° C. for 60 min, and were again measured for retardation value. The percentage change in retardation value was determined in the same manner as described above. The results were as follows.

Example 6

1% Change in Retardation Value

Comparative Example 6

6% Change in Retardation Value

The invention claimed is:

1. An optical device, comprising:
   a support; and
   an optical function layer provided on the support;
   wherein:
   the optical function layer is formed by curing a polymerizable liquid crystal material on the support so that the liquid crystal material retains a predetermined liquid crystal regularity, and subsequently subjecting the cured liquid crystal material to a first heat treatment at a predetermined temperature;
   the optical function layer is configured so that when the optical device is subjected to a second heat treatment at the predetermined temperature for a period of 60 minutes, the optical function layer undergoes a percentage reduction in layer thickness of not more than 5%; and
   the percentage reduction in layer thickness is given by (A-B)/A, where A is a first thickness of the optical function layer after the first heat treatment and B is a second thickness of the optical function layer after the second heat treatment.

2. The optical device according to claim 1, wherein the polymerizable liquid crystal material contains a photopolymerization initiator.

3. The optical device according to claim 1, wherein the support is a supporting substrate having an aligning ability.

4. A retardation layer laminate characterized by comprising a support and a retardation layer provided on the support and formed by curing a polymerizable liquid crystal material while retaining nematic regularity, smectic regularity, or cholesteric regularity, said retardation layer laminate having been heat treated at a predetermined temperature, said retardation layer having a percentage reduction in retardation, defined by (Ra-Rb)/Ra, of not more than 5% wherein Ra represents the retardation value of the retardation layer after the heat treatment and Rb represents the retardation value of the retardation layer after reheating the retardation layer laminate at said heat treatment temperature for 60 mm.

5. The retardation layer laminate according to claim 4, wherein the polymerizable liquid crystal material having cholesteric regularity comprises a photopolymerization initiator, a polymerizable liquid crystal monomer, and a polymerizable chiral dopant.

6. The retardation layer laminate according to claim 4, wherein the polymerizable liquid crystal material comprises a photopolymerization initiator and a polymerizable liquid crystal monomer.

7. The retardation layer laminate according to claim 4, wherein the support is a supporting substrate having an aligning ability.

8. A circularly polarized light controlling optical device, comprising:
   a support; and
   a cholesteric layer provided on the support;
   wherein:

the cholesteric layer is formed by curing a polymerizable liquid crystal material on the support so that the liquid crystal material retains cholesteric regularity, and subsequently subjecting the cured liquid crystal material to a first heat treatment at a predetermined temperature;

the cholesteric layer is configured so that when the optical device is subjected to a second heat treatment at the predetermined temperature for a period of 60 minutes, the cholesteric layer undergoes a percentage change in center reflection wavelength of not more than 5%; and the percentage change in center reflection wavelength is given by $|\lambda a - \lambda|/\lambda a$, where $\lambda a$ is a first center reflection wavelength of the cholesteric layer after the first heat treatment and $\lambda b$ is a second center reflection wavelength of the cholesteric layer after the second heat treatment.

9. The circularly polarized light controlling optical device according to claim 8, wherein the polymerizable liquid crystal material comprises a photopolymerization initiator, a polymerizable liquid crystal monomer, and a polymerizable chiral dopant.

10. The circularly polarized light controlling optical device according to claim 8, wherein the support is a supporting substrate having an aligning ability.

* * * * *